United States Patent [19]

Campman

[11] 3,728,642
[45] Apr. 17, 1973

[54] CAPACITOR MICROPHONE
[75] Inventor: James P. Campman, Silver Spring, Md.
[73] Assignee: Vidar Laboratories, Inc., Kensington, Md.
[22] Filed: Nov. 23, 1971
[21] Appl. No.: 201,552

[52] U.S. Cl..................332/2, 179/110 R, 331/65, 331/157, 332/26
[51] Int. Cl..............................H03c 1/46, H03c 3/28
[58] Field of Search ......................332/2, 26; 331/65, 331/157; 179/110 R, 111 R

[56] References Cited

UNITED STATES PATENTS

| | | | |
|---|---|---|---|
| 2,174,701 | 10/1939 | Koch | 331/157 X |
| 3,019,397 | 1/1962 | Cosby | 331/65 |
| 3,360,746 | 12/1967 | Weidknecht | 332/26 |
| 3,384,820 | 5/1968 | Dimeff et al. | 179/111 R X |
| 1,945,690 | 2/1934 | Hund | 332/26 |
| 1,639,000 | 8/1927 | Horton | 332/2 X |

*Primary Examiner*—Alfred L. Brody
*Attorney*—Jack H. Linscott

[57] ABSTRACT

The invention concerns improvements in a capacitor type microphone, comprising a printed circuit board having an aperture therethrough at one end thereof, a fixed but spacially adjustable plate member mounted in said aperture, a plastic membrane coated on one side with a magnetic conductive material stretched across said aperture, a magnet mounted adjacent said membrane and adjustable relative thereto for attracting the membrane thereto, means for directing sound waves through said aperture against said membrane to variably displace said membrane relative to said fixed plate, a tank circuit including an inductance and said capacitor formed by said membrane and said fixed plate having its resonant frequency varied in response to the displacement of said membrane, a frequency generating circuitry for feeding energy to said tank circuit and an output means for coupling the variable frequency output from said tank circuit to a point of utilization.

6 Claims, 6 Drawing Figures

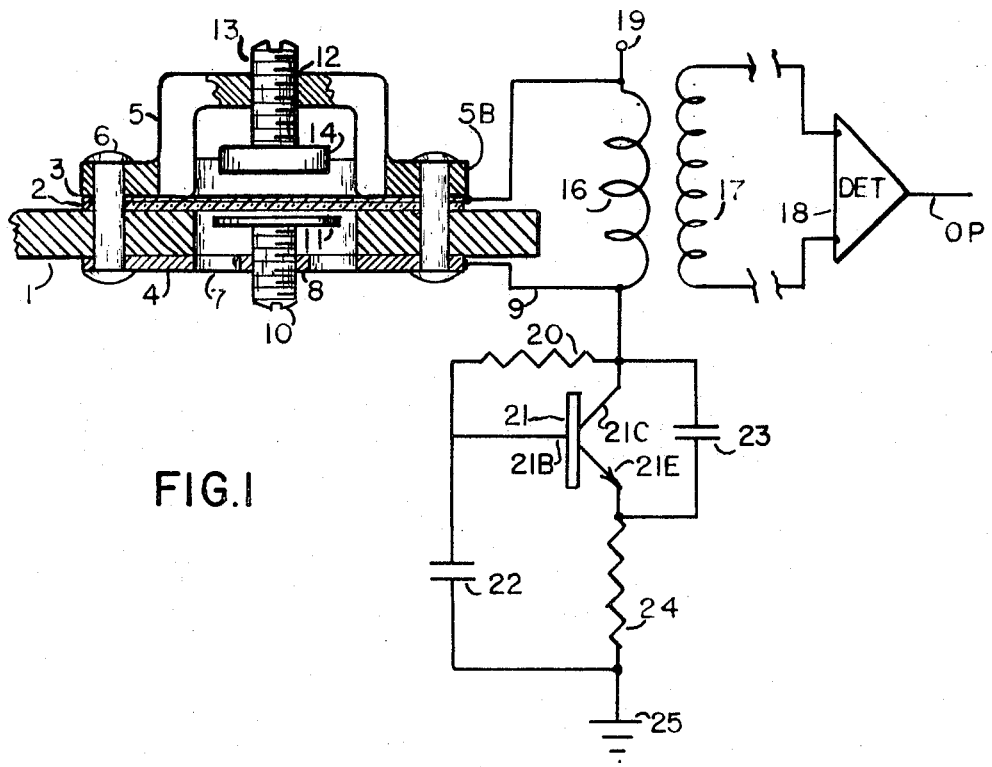
FIG.1
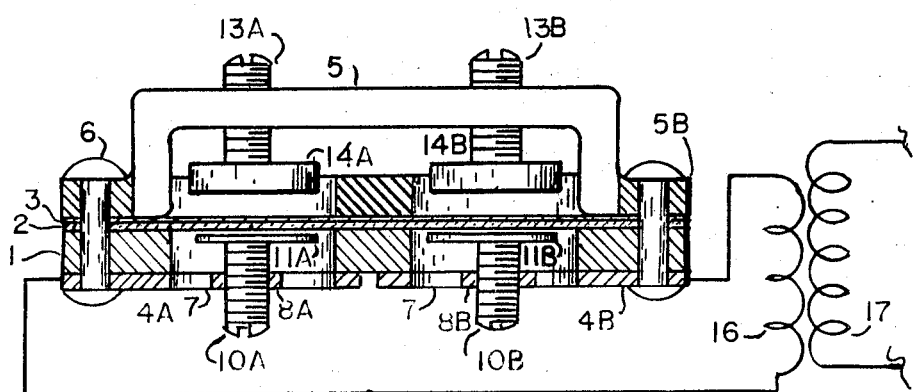
FIG.2
INVENTOR
JAMES P. CAMPMAN
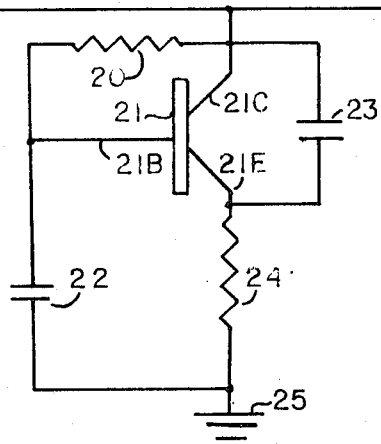
ATTORNEY

INVENTOR

JAMES P. CAMPMAN

BY Jack N. Linscott

ATTORNEY

CAPACITOR MICROPHONE

This invention relates to improvements in a capacitor type microphone having a fixed plate and a pressure actuated movable plate spaced therefrom forming the capacitor, wherein a variation in the spacing of the plate due to acoustical pressures, produce variations in the electrical capacitance of the capacitor. The variations produced in the electrical circuits coupling said capacitor to the output, differ considerably from the variations in the sound pressure waves, because of a number of distortion components that are introduced in the conversion of sound pressures to electrical energy variations.

Some of said distortion components are produced in the capacitor itself. For example, the movable plate or membrane has a resonant frequency at which the response of the membrane is at a maximum. On opposite sides of the resonant frequency the response drops off and the drop off of response on the upper side of the resonant frequency is sharper than on the lower side. Operation of the membrane in a range of frequencies that embraces the resonant frequency, introduces one distortion component because of the opposite changes in response in passing through the resonant frequency of the membrane.

Heretofore, arrangements have been made to displace the resonant frequency of the membrane from the range of audio frequencies in which the microphone is to operate. This has been accomplished by adjusting the tension in the membrane. The greater tension produces greater stiffness in the membrane and raises the resonant frequency of the membrane. Unfortunately, higher tensions and stiffness also decrease the sensitivity of the membrane. In the prior art microphones, fidelity is acquired through a sacrifice of sensitivity, and a compromise is made to acquire the best characteristics.

Also, in prior art microphones, it often occurs that distortion components are introduced in the presence of high amplitude sound waves. In these microphones, the acoustical pressures operate on the membrane in a direction to drive the membrane towards the fixed plate. A high bias voltage is impressed between the membrane and the fixed plate. This bias voltage creates an electrical field of force between the membrane and the fixed plate that tends to tension the membrane and draw it closer to the fixed plate. The spacing of the membrane and the fixed plate is usually very small and at high amplitudes of the sound waves driving the membrane toward the fixed plate and adding to the field of force of the bias voltage causes the membrane to collapse against the fixed plate.

In prior art microphones, attempts were made to remove the high amplitude caused distortions by adjustment of the spacing of the membrane and the fixed plate, by adjustment of the bias voltage to reduce the electrical field of force, and also by limiting the degree of movement of the membrane by increasing the stiffness of the membrane.

By the present invention, it is sought to overcome the prior art limitations on fidelity and sensitivity and to produce a microphone, which is light in weight, small in size, and less costly to produce.

Briefly, the structure is such that the acoustical pressures are applied to the side of the membrane to drive it in a direction away from the fixed plate, thus preventing to a large extent, the possibility of the membrane collapsing against the fixed plate. The bias voltage used is greatly reduced, thus reducing the force exerted between the plates due to the electrical field therebetween. This field is partially balanced by a magnetic field that acts on the membrane in a direction opposite to that produced by the electrical field, so that the membrane floats between the two fields. What tension needed to separate the resonant frequency from the audio frequencies is produced by the superior force exerted by the magnetic field on the membrane. These benefits and more are obtained through the use of simple expedients in the construction of the microphone and in its combination with a particular amplifying circuitry.

The object of this invention is to provide a microphone which will have a high degree of fidelity and sensitivity.

Another object is to provide a capacitor type microphone having a high degree of fidelity and sensitivity and one that is less expensive.

Still another object is to provide a capacitor type microphone that is small in size, light in weight yet having a high degree of fidelity and sensitivity.

It is also an object of the invention to provide a capacitor type microphone in which the characteristics will remain substantially constant over long periods of time.

Other objects will become apparent as the disclosure of the invention proceeds.

In the drawings

FIG. 1 partly in section and partly schematic discloses one embodiment of the invention.

FIG. 1 A is a plan view of the embodiment shown in FIG. 1.

FIG. 2, partly in section and partly schematic discloses the second embodiment of the invention.

Figure 1A:
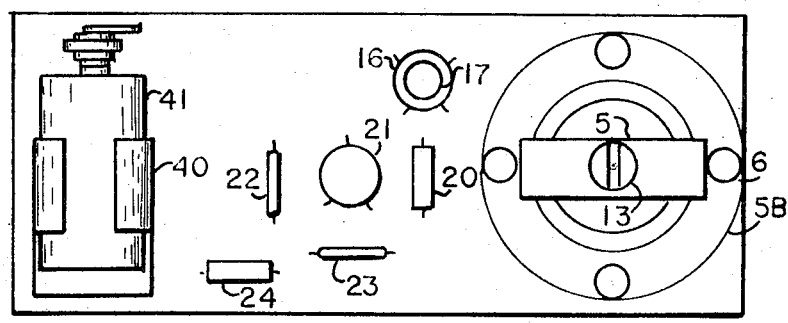

Referring to FIG. 1 of the drawings, the microphone is fabricated upon a printed circuit board 1, having the circuits printed thereon, not shown, and having an aperture through the board at one end thereof, to provide for the construction of the transducer element of the microphone.

The transducer element comprises a membrane 2 lightly stretched across the aperture and securely fixed to one side of the printed circuit board 1. The membrane 2 is made from "Mylar." a polyethyleneterephthalate material. On the side of the membrane away from the printed circuit board, it is coated with a conductive magnetic material 3 to form one plate of the capacitor microphone and to provide a membrane, which when in a magnetic field will be acted upon by a force of said field.

On the side of the printed circuit board 1 opposite to that upon which the membrane is mounted a strip 4 of non-magnetic material, such as aluminum or brass, which spans the aperture and which provides a screw threaded hole in portion 8 in axial alignment with the axis of the aperture of the printed circuit board. The strip 4 is perforated by a plurality of apertures 7 arranged in a circle about the portion 8 , to form a passage into the aperture in the printed circuit board for access of acoustical pressures to the underside of the membrane 2 as viewed in FIG. 1.

In the threaded midportion 8 is screw threaded the shank 10 having integral therewith a disk shaped plate 11. The plate is perforated with a multiplicity of small apertures over the annular portion thereof exterior of the shank to permit passage therethrough of the acoustical pressures . Also the disk 11 has a smaller diameter than the aperture in the printed circuit board 1 allowing passage of the acoustical pressures through the annular area thus provided.

The screw threaded mounting of the disk 11 provides for adjustment of the spacing between the disk 11 relative to the membrane 2 initially after assembly and subsequently as required due to expansion of the membrane 2 due to the flow of the materials therein . The shank 10 and the plate disk 11 are fabricated from a non-magnetic material , as for example brass or aluminum , to isolate the magnetic circuit to the upper side of the membrane . The strip 4 is connected to the printed circuit of the printed circuit board and the conductor 9 is representative of said connection .

Upon the upper surface of the membrane 2 , in contact with the magnetic conductive coating 3 is mounted a bridge member 5 made of magnetic material . The bridge member 5 has a ring shaped base portion 5B in engagement with the coating 3 and from which the bridge portion extends. The bridging portion extends diametrically across the aperture in the printed circuit board. The midportion of the bridge is drilled and screw threaded at 12 to receive a magnet 13 having external threads thereon . On the end of the magnet 13 is a pole piece 14 in the form of a disk having a diameter less than the diameter of the aperture in the printed circuit board . Rotation of the magnet 13 in the bridge 5 adjusts the spacing between the pole piece 14 and the magnetic coating 3 and also the field strength in the air gap between the pole piece 14 and coating 3 . The magnetic circuit including the air gap includes the coating 3 and the bridge 5 with the permanent magnet furnishing the magnetic flux . The strength of the field in the air gap depends upon the strength of the magnet and the width of the air gap . The width of the air gap being adjustable , the intensity of the field therein is adjustable whereby the force exerted on the membrane is adjustable . The bridge member 5 is affixed by nonconductive rivets such as plastic rivets 6 . Connection is made between the membrane coating 3 and the printed circuit which includes the various components necessary for the conversion of the acoustical pressure variations to frequency variation in the output .

As it will be seen from the structure described , the fixed plate 11 and the membrane 2 form the two plates of a capacitor . The membrane is movable relative to the fixed plate 11 in response to variations of acoustical pressures directed against the under side of the membrane 2 through the apertures 7 and the apertures in the disk 11 . Movement of the membrane 2 relative to the fixed plate 11 produces a variation in capacitance. The variable capacitor is connected in parallel with the inductor 16 to make up a tank circuit having a resonant frequency depending on the inductance of inductor 16 which is substantially constant and the capacitance of the capacitor formed by fixed plate 11 and membrane 2. Variation of the capacitance varies the resonant frequency of the tank circuit about a quiescent resonant frequency . The resonant frequency of the tank circuit controls the frequency of an oscillator or generator of radio frequencies..

The tank circuit including the transducer capacitor is connected between a source of voltage as represented by terminal 19 in the schematic and shown as a battery 41 in FIG. 1A , and an oscillator or generator comprising a transistor 21 having a collector electrode 21C. Between the collector electrode 210 and the base electrode 21B is connected a biasing resistor 20. The base electrode 21B is also connected through capacitor 22 to ground 25, this being an AC ground connection for the base electrode 21B . The emitter electrode 21E is connected through biasing resistor 24 to the ground 25 and through a feedback capacitor 23 to the collector electrode 210. The source of electrical energy , that is , the battery 41 is connected at its other terminal to ground 25 thus completing the electrical circuit through the tank circuit and the oscillator .

The inductor 16 is one winding of a transformer having a secondary winding 17 inductively coupled therewith . The winding 17 provides the output connection from the microphone to the means for conducting or transmitting the signal therefrom to the point of utilization . The connection may be a shielded cable or an antenna. The utilizing apparatus will have a means for converting the signal such as the detector 18 which in this example converts the frequency modulated signal to voltage variations for operation of a speaker and the like . The means for utilization of the output forms no part of the present invention and is therefore not disclosed further .

Figure 2A:
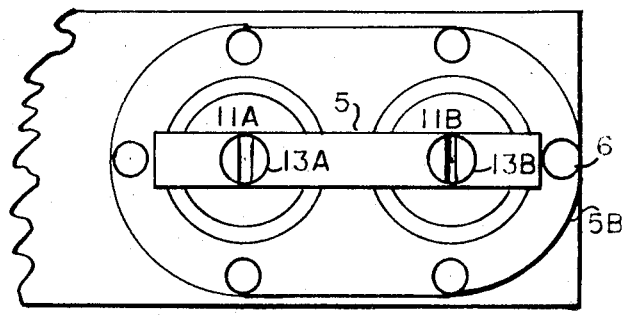
FIG. 2A is a fragmentary plan view of the embodiment of the invention shown in FIG. 2.

FIGS. 2 and 2A disclose the second embodiment of the invention and is substantially the same as that shown in FIGS. 1 and 1A, except that two transducers are provided in the place of one transducer , as shown in FIG. 1 . The two transducers are connected in series across an inductance 16 to form the tank circuit for the oscillator . The tank circuit and the oscillator circuit is the same as that of the first embodiment and will not be described further .

The printed circuit board 4 FIGS. 2 and 2A is provided with two apertures therethrough. They may be arranged either transversely or longitudinally of the board 4 , which ever is preferred . They are shown as arranged longitudinally of the board 4 . The membrane 2 is common to the two microphones and is stretched across both apertures . The membrane 2 , as in the first embodiment , is coated with a magnetic conductive material 3 whereby it acts as one plate of the capacitor and is responsive to a magnetic field . A bridge member 5 having a base member 5B seated on the membrane 2 engaging the coating 3 is attached to the board 4 and serves also to secure the membrane to the board 4 . The base portion 5B is formed with two apertures having the same diameter as the apertures in the board 4 and alined with the apertures in the board . The bridge 5 spans the two apertures along a common diameter of the two apertures to form a mounting means diametrically of the apertures for the magnetic field producing means .

The bridge member 5 is drilled at points thereof alined with the axes of the two apertures and is screw threaded to receive the threaded magnets 13A, 13B. Each magnet has a pole piece 14A, 14B and the pole pieces are adjustable in spaced relation to the coating 3 on the membrane 2.

The two transducers have separate supporting means for the fixed plate members affixed to the under side of the board 4 as viewed in FIG. 2. The strips 4A and 4B span the separate apertures in the board 4 and are affixed to the board by the rivits 6 which in the present example of the invention are made of plastic material. The strips 4A and 4B have a portion 8A and 8B respectively through which is drilled an aperture that is threaded to receive the shanks 10A and 10B respectively. The shanks 10A, 10B have disks mounted thereon which have a diameter less than the diameter of the apertures in which they are positioned to form annular passages between the peripheral edge of the disks and the walls of the apertures. The disks 11A, 11B, their shanks 10A, 10B and the strips 4A 4B are fabricated of conductive but nonmagnetic materials as for example aluminum or brass.

The disks 11A and 11B may be pierced by a multiplicity of small apertures to permit the movement of air through the annular area of the disks extending beyond the shanks that support them. As an alternative, the disks 11A and 11B may be formed of metal screen material that will provide the transverse passages.

The two transducers having a common membrane are connected together thereby. One strip member 4A is connected to one end of the winding 16 and the other strip member 4B is connected to the other end of the winding 16. As will be seen, the two capacitors formed in the two transducers are connected in series across the winding 16 and operate in the same manner to produce changes in capacitance in response to acoustical pressures. These changes in capacitance effect corresponding changes in the frequency of the output in the same manner as is disclosed relative to the first embodiment of the invention.

Figure 3:
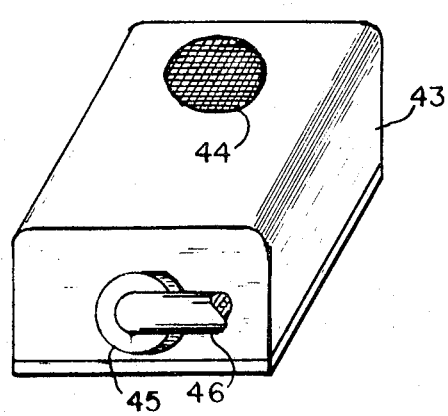
FIG. 3 is a perspective view of the casing in which the microphone is mounted.

FIG. 3, discloses the casing 43 of the microphone having a grommet 45 for the shielded cable 46 that conducts the output to the point of utilization and having a screened opening 44 through which the acoustical pressures may pass to the membrane of the transducers. The board 4 of the transducer is positioned within the casing 43 with the fixed plate side, adjacent the screened opening 44, so that the pressures acting to activate the membrane are directed through the aperture in the board 4 to drive the membrane in a direction away from the fixed plate of the capacitor. In this manner, the likelihood that the membrane 2 will collapse against the fixed plate when subjected to high amplitude sound waves is very much minimized. The electrical field between the plates of the capacitor is also a factor in minimizing collapsing of the membrane against the fixed plate. It is made low thus reducing the force that tends to draw the membrane towards the fixed plate to a minimum. The bias voltage producing the electrical field is that which is applied across the tank circuit and will always be less than the voltage of the source, usually less than nine volts.

Figure 4:
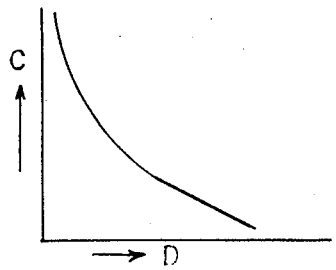
FIG. 4 is a chart disclosing the variation of capacitance with distance between the plates of the capacitor.

The two embodiments of the invention have substantially the same mode of operation. As illustrated, the membrane is driven away from the fixed plate to increase the distance separating the membrane and the fixed plate. As shown in FIG. 4, the capacitance decreases with increase in distance D of the spacing of the membrane and the fixed plate. This change in capacitance in the tank circuit, causes a change in the frequency of the tank circuit. The tank circuit is supplied with electrical energy by the transistor oscillator 21, that oscillates at a frequency determined by the tuned frequency of the tank circuit. Consequently, the output of the tank circuit is inductively picked up by the winding 17, and is a frequency modulated signal, that may be conducted by shielded cable 46 or by an antenna (not shown) to the point of utilization.

The utilization of changes in the capacitance wrought by the acoustical pressures, to produce a change in frequency of the output has the advantage, that a greater amplification is obtained, that permits a smaller range of movement of the membrane and less distortion.

The membrane 2 is in effect suspended between two opposing fields, one the electrical field produced by the biasing voltage between the membrane 2 and the fixed plate 11 and the other, a magnetic field produced by the permanent magnet 13 acting on the magnetic material of the coating 3 of the membrane 2. The magnetic field is adjusted by spacing the pole piece 14 relative to the membrane and is made to exceed that of the electrical field. This permits the utilization of a thinner membrane and one that is more sensitive to acoustical pressures than is obtainable by thicker membranes. The tension in the membrane is largely produced by the force of the magnetic field, that causes the removal of the resonant frequency of the membrane beyond the audio frequency range at which the membrane is to operate. This assures a greater freedom from distortion and at the same time greater sensitivity.

In use, the membranes expand and take on a stretched condition. In the present structure, since the tension is not produced by initially tensioning the membrane, but instead, by the magnetic field that exerts substantially a constant pull on the membrane the tension of the membrane remains substantially constant. Thus over long periods of time the characteristics of the microphone will remain substantially constant. Short time changes, as for example, those created by temperature changes, are in effect nullified.

The spacing of the fixed plate can be adjusted initially for optimum operational characteristics and also to correct for changes in spacing due to the expansion of the membrane.

The transducer, thus produced has a sensitivity and fidelity comparable favorably with those costing several times that of the present microphone.

The transducer is economical to produce, it being made from materials readily available and through operations that are largely that of punching. It is small in size light in weight and adaptable for a multiplicity of uses.

These and other advantages apparent from the disclosure offers considerable merit to the present invention and what I claim to be my invention is set forth in the following claims.

I claim:

1. A capacitor type microphone having a fixedly positioned member forming one plate of a capacitor; a membrane coated with an electrically conductive magnetic material mounted parallel to and spaced from said member forming the second plate of said capacitor; means for creating an electrical field between said plates for producing a force on said membrane in a direction towards said fixedly positioned member; means mounted in spaced parallel relation to said membrane on the side opposite said fixedly positioned member for creating a magnetic field between itself and said membrane for producing a force on said membrane in a direction away from said fixedly positioned member, whereby said membrane is operative in opposing force fields and means coupled to said fixedly positioned member and said membrane responsive to movement of said membrane relative to said member and to changes in capacitance caused thereby to produce a frequency modulated output signal.

2. A capacitor type microphone for producing a frequency modulated signal voltage comprising ;
  a membrane member coated with a magnetic and electrical conductive coating material forming one plate of a capacitor mounted under tension in one parallel plane ;
  an electrically conductive member mounted in spaced parallel relation to said membrane member forming the other plate of the capacitor;
  means mounted in a parallel plane in spaced relation with said membrane member on the side of said membrane member opposite that of said electrically conductive member for creating a magnetic field for exerting a magnetic force on said membrane member in a direction away from said electrically conductive member to place said membrane member under increased tension ;
  means associated with said last named means for adjusting the spacing between said last named means and said membrane member for adjusting the force exerted on said membrane member by said magnetic field.
  means for creating an electrical field between said membrane as said electrically conductive member operative to produce a force on said membrane member in opposition to that produced by said magnetic field ;
  means for admitting acoustical pressures to said membrane member in a direction of said magnetic force to vary the capacitance of said capacitor in response thereto ; and
  means responsive to movement of said membrane member relative to said electrically conductive member and to changes in capacitance caused thereby to produce a frequency modulate output voltage signal .

3. A capacitor type microphone as set forth in claim 1, wherein said last mentioned means comprises ;
  a transistor oscillator having a resonant circuit for determining the oscillating frequency thereof
  said resonant circuit including a primary winding of an output transformer for providing the inductance of said resonant circuit and said capacitor formed by said membrane member and said electrically conductive member to provide the capacitance of said resonant circuit ; and
  means connected to said output transformer for transmitting said frequency modulated signal .

4. A capacitor microphone as set forth in claim 2 wherein said means mounted on the opposite side of said membrane member from that of said electrically conductive member ;
  a permanent magnet;
  and said means for adjusting the magnet field comprises a threaded shank attached to said permanent magnet ; and
  a screw threaded support for said shank , whereby the rotative motion of said shank will change the spacing of said magnetic member relative to said membrane member .

5. A capacitor microphone as set forth in claim 2 further including ;
  means for adjustably mounting said electrically conductive member in spaced relation to said membrane member comprising
  a threaded shank member; and
  a threaded support member receiving said shank permitting the spacing of said membrane member and said electrically conductive member to be adjusted .

6. The combination as set forth in claim 2, wherein said means responsive to movement of said membrane member relative to said electrically conductive member includes ; a resonant circuit having an inductance and including the capacitance between the membrane member and said electrically conductive member , and further including means attached to said electrically conductive member for adjusting the spacing between said electrically conductive member and said membrane member for varying the capacitance and the resonant frequency of said resonant circuit .

* * * * *